June 13, 1967 G. GUYON 3,324,749
TOOL JOINT REFACER
Filed Jan. 18, 1965 2 Sheets-Sheet 1

Gerard Guyon
INVENTOR.

BY
Edward Emely Bundy

June 13, 1967 G. GUYON 3,324,749
TOOL JOINT REFACER
Filed Jan. 18, 1965 2 Sheets-Sheet 2

Gerard Guyon
INVENTOR.
BY

United States Patent Office 3,324,749
Patented June 13, 1967

3,324,749
TOOL JOINT REFACER
Gerard Guyon, Edmonton, Alberta, Canada, assignor to Hycalog (Canada) Ltd., Edmonton, Alberta, Canada
Filed Jan. 18, 1965, Ser. No. 426,326
3 Claims. (Cl. 82—4)

This invention relates to devices for refacing the ends of tool joints.

Tool joints as used in oil well drilling may be either the male or female type and generally have some form of shoulder or end that periodically must be refaced to ensure an accurate fit when the joints are coupled together.

Up to the present time it is customary to reface the ends of the tool joints by either supporting the tool joint in a lathe bed and then rotating the tool joint so that the lathe tools can be used to true the end of the tool joint and then rotated to grind the end of the tool joint.

My invention is designed to overcome the disadvantages in the prior methods and will provide apparatus that is portable and that may be attached to the end of the tool joint while the joints are stacked and that then may be rotated to true the end of the tool joint without the necessity of the tool joint or pipe being rotated.

My invention includes: an engaging portion adapted for co-axial engagement with a tool joint end, a refacing portion having a radially moveable cutting tool adapted for co-axial rotation about the engaging portion; means to coincidentally rotate the refacing portion and move the cutting tool radially and means to engage and disengage the cutting tool with the tool joint end.

In drawings illustrating a preferred embodiment:

Figure 1:
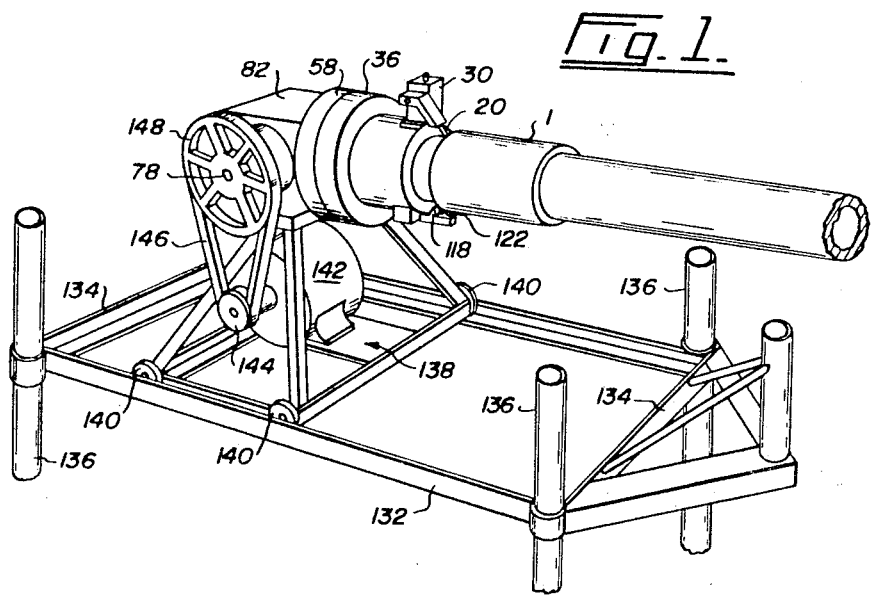
FIGURE 1 is a perspective view of my device attached to a tool joint on a section of pipe for refacing the end of the tool joint.
Figure 2:
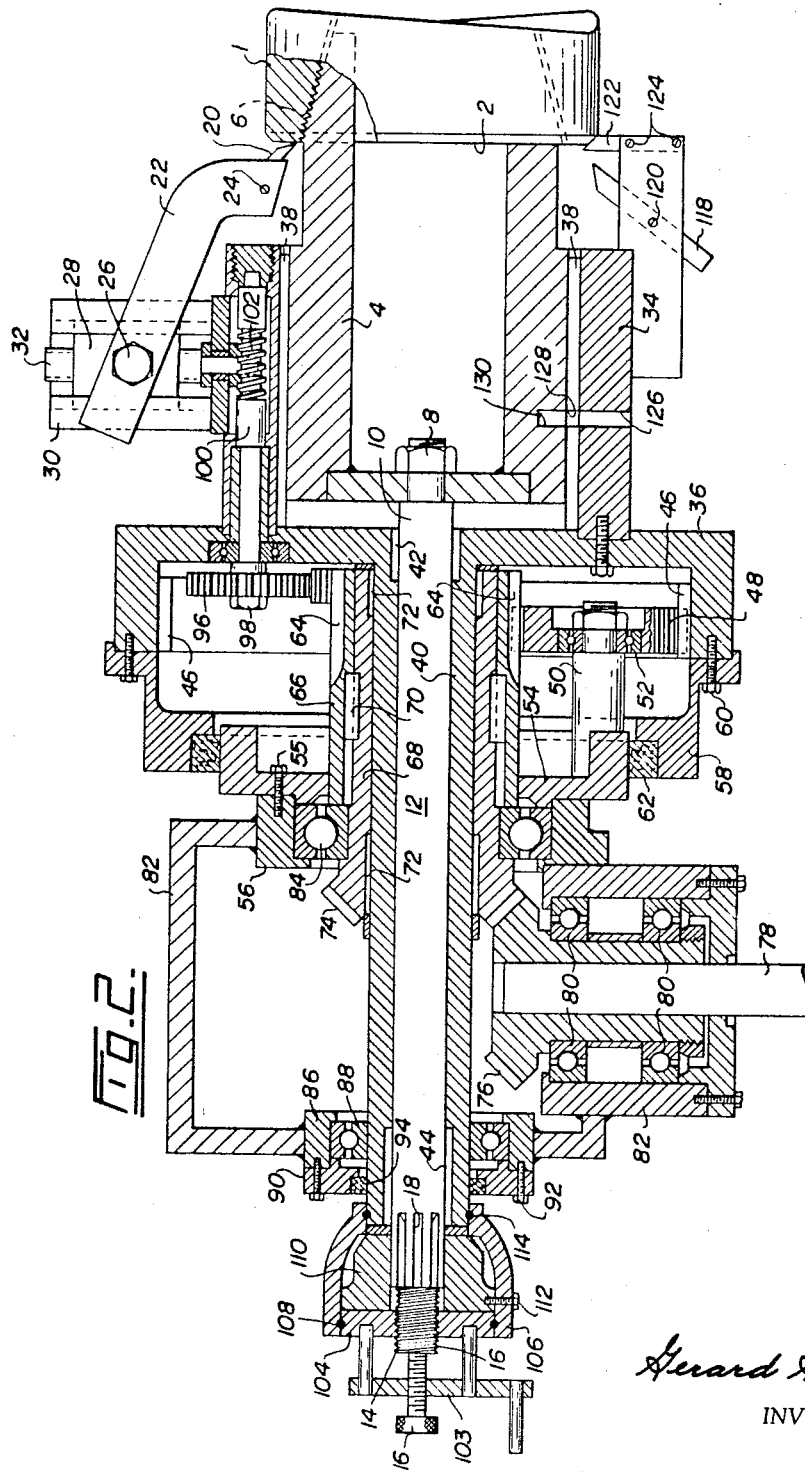
FIGURE 2 is a sectional elevational of my apparatus shown attached to tool joint to be refaced and with the actuating mechanism not shown.

A tool joint 1, in this case a female, is to have its end 2 refaced. The engaging portion of the device consists of the adapter 4 which is engaged threadably at 6 with the tool joint and which is secured coaxially by the bolt 8 to one end 10 of the stationary feed shaft 12. The opposite end 14 of the stationary feed shaft is threaded at 16 and is formed with peripheral splines 18.

The refacing portion consists of the cutting tool 20 secured at the forward end of the tool holder 22 by the screw 24 or like means with the tool holder 22 secured adjustably by the bolt 26 to the tool slide 28. The tool slide 28 is mounted slideably in the slide holder 30 and is moved up and down in the slide holder 30 by rotation of the feed screw 32. The slide holder 30 is mounted on and projects radially from the cylinder 34 which projects from the drive housing 36 and which rotates on needle bearings 38 surrounding the member 4.

The drive housing 36 is an integral part of the housing sleeve 40 which fits over the shaft 12 and is mounted rotatably on needle bearings 42 and 44 located at opposite ends of the shaft 12.

The inner periphery of the housing 36 is formed with teeth 46 which mesh with the idler gear 48 mounted for rotation on bearings 52 on the shaft 50.

The shaft 50 is secured by welding or other suitable means to the stationary collar 54 which is secured through bolts 55 or other suitable means to the stationary bearing retaining ring 56. The stationary collar 54 forms part of the back cover for the housing the 36, the remaining portions of the back cover comprising the ring 58 which is secured by bolts 60 or other means to the housing 36 and which rotates with the housing 36. A fluid seal with the exterior of the stationary ring 54 is provided through the packing ring 62.

Drive for the housing 36 is transmitted through the idler gear 49. The idler gear 48 is in engagement with the teeth 64 on the sleeve 66 which is coupled to the driving sleeve 68 by the key 70. The driving sleeve 68 is mounted for rotation on the housing sleeve 40 through the bearings 72 and is formed at its one end into a bevel gear 74. The bevel gear is in engagement with the bevel gear 76 on the drive shaft 78. The drive shaft 78 with gear 76 is mounted for rotation in suitable bearings 80 in the stationary housing 82 with the shaft 78 projecting from the housing for attachment to a suitable power source.

The stationary housing 82 forms part of the bearing retaining ring 56 which is in engagement with and contains the bearing 84 on the driving sleeve 68. An additional bearing retaining ring 86 fits over the bearing 88 which is mounted on the housing sleeve 40. The cap 90 secured by bolts 92 or other suitable means to the bearing ring 86 contains the bearing 88 within the ring 86 and has a fluid tight rotating contact with the housing sleeve 40 through the oil ring 94.

The teeth 64 of the driving gear sleeve are also in engagement with the feed gear idler 96 which is secured through the fastening nut 98 to one end of the worm shaft 100.

The worm shaft 100 is in driving engagement with a gear 102 secured to the end of the feed screw 32 so that rotation of the worm 100 will rotate the feed screw 32 and move the slide 28 up and down in the slide holder 30.

Longitudinal movement of the device to adjust the depth of cut of the tool 20 is achieved by rotating the feed handle 103. Rotation of the feed handle 103 rotates the feed nut 104 which is engaged threadably on the threads 16 and which rotates within the housing 106 on the bearing 108. The housing 106 is secured to the body member 110 through the locking bolt 112 and the body member 110 is engaged slidably to the splines 18. Rotation of the feed handle 103 will exert force against the body member 110 to move the entire assembly with relation to the stationary feed shaft 12 and adjust the engagement of the cutting tool 20 on the tool joint 1.

A bearing 114 is provided at the forward end of the housing 106 so that the housing 106 can rotate on the housing sleeve 40. A locking screw 116 projects through the feed handle 103 to engage on the end of the feed shaft 12 and thereby permit locking of the handle 103 against unwanted movement once the adjustment of the cutting tool 20 has been made.

Additional cutting tools 118 and 122 are mounted on the cylinder 34 and are positioned so that they may be adjusted in their mountings to provide stress relief cuts in the end 2 of the tool joint 1. The tools 118 and 122 are secured in their mounting on the cylinder 34 by holding screws 120 and 124.

Provision to lock the cylinder 34 to the adapter 4 when connecting the adapter into or withdrawing the adapter from the tool joint is provided by the openings 126 in the cylinder 34, 128 in the bearings 38 and 130 in the adapter 4. Obviously when these openings are aligned it is possible to insert a pin or other locking device to effectively lock the adapter 4 and cylinder 34.

In operation the device is mounted preferably on a framework consisting of longitudinal members 132 and lateral members 134 secured on vertical pipes 136 with a travelling support indicated generally at 138 having wheels 140 which engage with and ride on the longitudinal member 132.

A power source, in this case an electric motor 142 is mounted securely on the support 138 and is coupled through the drive pulley 134 and a drive belt 146 to the driven pulley 148 secured on the end of the drive shaft 178.

As illustrated in FIGURE 1 in the drawings the device is engaged in a tool joint 1 and it will be obvious that operation of the power source 142 will rotate the cutting tool 20 to reface the end 2 of the tool joint 1. While not illustrated, some means as for example, a chain vise or similar device would be used to grip the tool joint 1 and prevent unwanted rotation of the tool joint while the end was refaced.

While we have described and illustrated this device for refacing a female tool joint, it will be obvious that the device could be used with equal facility to reface a male tool joint. In such a case the adapter unit 4 would be such that it would engage on the male tool joint and once this was done the cutting tool 20 would operate in the same fashion to reface the tool joint end.

In operation the apparatus would be assembled substantially as illustrated in FIGURE 1 and connected to a tool joint as illustrated. The cutting tool 20 would then be positioned toward the outside or the outer diameter of the face 2 of the tool joint and the handle 103 would be rotated to bring the cutting tool 20 into engagement with the end to be refaced. The power source 142 would then be started to rotate the cutting tool and through the gearing described this would, at the same time, move the cutting tool radially of the tool joint so that a cut across the face of the tool joint would be made.

Obviously the adjusting handle 103 would then be adjusted as required to make whatever successive cuts were needed until the end of the tool joint was refaced correctly.

What I claim as my invention is:

1. Apparatus for refacing the ends of tool joints comprising:
    an engaging portion adapted for threaded co-axial engagement with a tool joint;
    a refacing portion mounted co-axially on the engaging portion and having a cutting tool mounted thereon adapted to be moved radially with respect to the refacing portion;
    means to move the refacing portion to engage and disengage the cutting tool with the end of the tool joint;
    means to rotate the refacing portion; and
    means interconnecting the cutting tool and the refacing portion whereby rotation of the refacing portion will result in simultaneous radial movement of the cutting tool.

2. Apparatus for refacing the ends of tool joints comprising:
    an engaging portion adapted for threaded co-axial engagement with a tool joint;
    a refacing portion mounted co-axially on the engaging portion and means to rotate the refacing portion;
    a slide holder mounted on the refacing portion, such slide holder having a slide adapted to move radially with respect to the refacing portion and means to move the slide;
    a cutting tool secured to the slide;
    gearing interconnecting the means to move the slide with the means rotating the refacing portion whereby rotation of the refacing portion will cause simultaneous radial movement of the slide.

3. The apparatus as claimed in claim 1 wherein the means interconnecting the cutting tool and the refacing portion comprises:
    a feedscrew in engagement with the cutting tool whereby rotation of the feed screw will move the cutting tool radially;
    a worm gear in driving engagement at one end with the feed screw whereby rotation of the worm gear will rotate the feed screw and in driven engagement at its opposite end with the refacing portion whereby rotation of the refacing portion will rotate the worm gear.

References Cited
UNITED STATES PATENTS

| | | | |
|---|---|---|---|
| 1,674,372 | 6/1928 | Nonneman | 82—4 |
| 2,124,024 | 3/1964 | Pittman | 82—4 |
| 3,181,398 | 4/1965 | Rogers | 82—4 |
| 3,202,190 | 8/1965 | Gill | 82—4 |

HARRISON L. HINSON, *Primary Examiner.*